Sept. 13, 1966  C. A. ROWLEY  3,271,856
KITCHEN IMPLEMENT HANDLE
Filed April 20, 1964

INVENTOR.
CHARLES A. ROWLEY
BY Hazard & Miller
ATTORNEYS 3,271,856
KITCHEN IMPLEMENT HANDLE
Charles A. Rowley, 7803 E. Harper, Downey, Calif.
Filed Apr. 20, 1964, Ser. No. 361,107
4 Claims. (Cl. 30—343)

This invention relates to kitchen implements such as spoons, forks, spatulas, knives, or the like.

One of the objects of the invention is to provide a kitchen implement with a metallic shank wherein the lower end has secured thereto a spoon bowl, fork tines, a spatula or knife blade, or the like, and the upper end of the shank is provided with a handle formed of a translucent material, such as a suitable relatively hard plastic substance wherein the plastic substance has flecks of a contrasting colored light-reflecting material, preferably a metal, wherein the translucency of the plastic material tends to obscure the upper end of the shank anchored therein, and wherein the diffusion of light throughout the plastic material by the light-reflective flecks cooperates with the translucent plastic to obscure visibility of the anchored portion of the shank in the handle.

Another object of the invention is to provide a kitchen implement with a handle, as described above, wherein that portion of the handle which receives the upper end of the shank is of such thickness that the translucency of the plastic and the light-reflective qualities of the flecks are sufficient to substantially obscure that portion of the shank which extends into and is anchored in the handle.

The above and other objects will more fully appear from the following description in connection with the accompanying drawing, in which.

Figure 1:
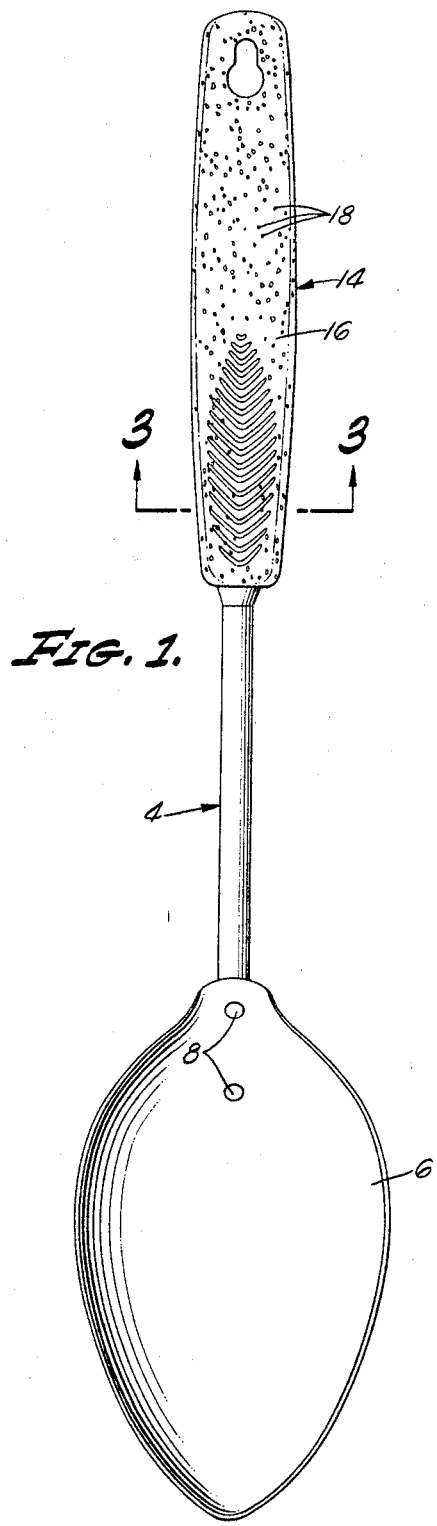
FIG. 1 is a plan view of a kitchen implement embodying the invention.
Figure 2:
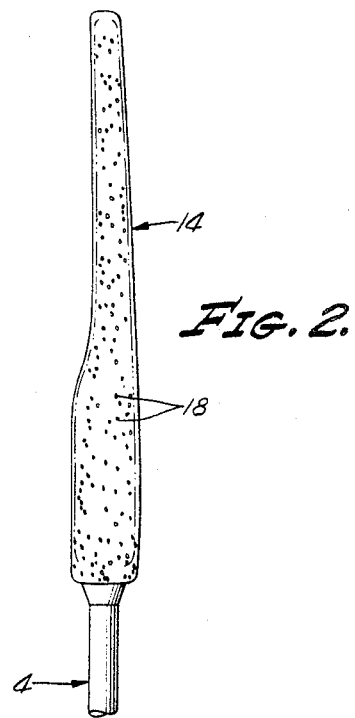
FIG. 2 is a side elevational view of the handle and a portion of the shank.
Figure 3:
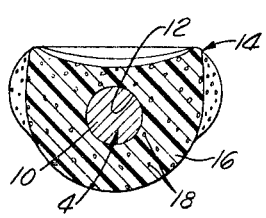
FIG. 3 is an enlarged sectional view taken approximately on the line 3—3 of FIG. 1.

The implement illustrated is a kitchen spoon which includes a shank 4 having a lower end provided with a spoon bowl 6 secured to the shank as by rivets 8.

The shank 4 has an upper end portion 10 suitably anchored or secured in a socket 12 formed in a handle 14. The handle 14 comprises a body 16 of translucent plastic material which is relatively hard and heat resistant. Dispersed through the translucent plastic 16 are flecks 18 of a light-reflective material such as a bright metal. These particles or flecks 18 are preferably small bright metal shavings which have shiny light-reflecting surfaces and are disposed at various angles throughout the plastic in spaced relation to each other.

The translucency of the plastic 16 and the diffusive effect of the flecks 18 combine to obscure the visibility of the upper end 10 of the shank 4 so that the ornamental appearance of the handle 14 is not marred by the inwardly projecting portion of the shank.

Additionally, the plastic material with its flecks 18 is sufficiently thick around the upper portion 10 of the shank of the implement so that together with the translucency of the plastic, and the light-diffusing effect of the flecks obscures the shank. If the plastic surrounding the inserted end of the shank is too thin, of course the plastic 16 would have to be made more nearly opaque and thereby destroy the ornamental appearance of the metallic flecks except at the surface of the plastic; whereas, it is intended that the plastic 16 have a quite low degree of opacity so that the flecks below the surface can be seen readily and will reflect and diffuse light.

It should also be noted that since the metallic light-reflective flecks are below the surface of the handle, they cannot become dislodged by handling or other wear and tear, such as contact with other articles when displayed for sale or in actual use.

It should be understood that changes can be made in the form, details, arrangement and proportions of the illustrated embodiment of the invention without departing from the spirit thereof.

I claim:

1. The combination with a kitchen implement having a metallic shank with a lower end and an upper end, of an elongated handle of a translucent material having a socket extending inwardly from one end thereof, the upper end of said shank being secured in said socket, said translucent handle having flecks of light-reflecting material dispersed therethrough beneath the outer surface thereof, the translucency of the material of said handle and the diffusion of light by said flecks of light-reflecting material being such that visibility of said upper end of the shank is obscured.

2. The combination with a kitchen implement having a metallic shank with a lower end and an upper end, of a handle of a translucent material having an elongated socket therein, the upper end of said shank being secured in said socket, said translucent handle having flecks of light-reflecting material dispersed therethrough beneath the outer surface thereof, the translucency of the material of said handle and the diffusion of said light by said flecks of light-reflecting material and the cross-sectional thickness of said translucent material about the upper end of said shank being such that the visibility of said upper end of the shank is obscured.

3. The combination with a kitchen implement having a metallic shank with a lower end and an upper end, of an elongated handle of a translucent material having a socket extending inwardly from one end thereof, the upper end of said shank being secured in said socket, said translucent handle having flecks of light-reflecting material dispersed therethrough beneath the outer surface thereof, including that portion thereof about said socket.

4. The combination iwth a kitchen implement having a metallic shank with a lower end and an upper end, of an elongated handle of a translucent material having a socket extending inwardly from one end thereof, the upper end of said shank being secured in said socket, said translucent handle having flecks of light-reflecting material dispersed therethrough beneath the outer surface thereof, whereby said flecks beneath said outer surface are protected from displacement by handling and contact with other objects.

References Cited by the Examiner

UNITED STATES PATENTS

| | | |
|---|---|---|
| D. 191,948 | 12/1961 | Latham. |
| D. 199,653 | 11/1964 | Weissenborn. |
| D. 199,799 | 12/1964 | Rowley. |
| 2,122,156 | 6/1938 | Scholtz. |
| 2,724,894 | 11/1955 | La Tour. |

WILLIAM FELDMAN, *Primary Examiner.*

JAMES L. JONES, JR., *Examiner.*